Oct. 31, 1967 C. H. BREDALL 3,350,549
SATELLITE TRAJECTORY SIMULATOR
Filed April 21, 1964 2 Sheets-Sheet 1

INVENTOR.
CHARLES H. BREDALL
BY
ATTORNEYS

INVENTOR.
CHARLES H. BREDALL
BY Wade Koontz
Arsen Tashjian
ATTORNEYS

United States Patent Office 3,350,549
Patented Oct. 31, 1967

3,350,549
SATELLITE TRAJECTORY SIMULATOR
Charles H. Bredall, Pacific Palisades, Calif., assignor to the United States of America as represented by the Secretary of the Air Force
Filed Apr. 21, 1964, Ser. No. 361,599
4 Claims. (Cl. 235—150.27)

This invention relates to an instrument for simulating the trajectory and attitude of a satellite with relation to the earth and is primarily concerned with providing an instrument which is capable of quickly simulating satellite trajectory, satellite attitude and time to determine the aspect of the satellite at various points of an orbital pass with respect to a predetermined point of observation.

Ordinarily in order to make instantaneous determinations of the relative position and attitudes of an orbiting body such as a satellite it is necessary to perform a large number of laborious calculations in the field of spherical trigonometry or utilize a digital computer wherein a special computer program must first be developed by highly trained personnel resulting in a relatively expensive operation. This complicated process is required because of the number of variables or parameters involved in the determination of a satellite trajectory, such as the satellite attitude and aspect angle including the yaw, pitch and roll conditions, and the time to determine the aspect of the satellite that is perceptible to an observation point at various points of an orbital pass.

The present invention solves the problem of quickly determining the satellite aspect as a function of sensor location, satellite trajectory, satellite attitude, and time by simulating operations over a large range of altitudes and inclination angles yielding solutions which indicate the aspect of the satellite with respect to locations on or near the earth's surface. Quantitative indications of the attitude of the satellite are found in terms of elevation and azimuth angles and the range is directly measurable.

Accordingly, it is an object of the invention to provide a device for simulating the position of a satellite relative to an observer and determining the attitude of the satellite with respect to the point of observation.

Another object of the invention is to provide an instrument which is capable of simulating the yaw, pitch and roll aspects of an orbiting satellite and determining the portion of the satellite which is perceptible to a predetermined observation point.

Still another object of the invention is to provide an instrument which indicates the attitude of a satellite quantitatively in terms of elevation and azimuth angles and provides a measurement of the range directly in terms of distance.

A further object of the invention is to provide an instrument for simulating the trajectory of an orbiting satellite which is relatively simple to construct and which can be operated by persons who have a minimum of training in the field. Heretofore, it has been necessary for highly skilled and trained personnel to program and operate complicated computer procedures in order to make the trajectory determinations which are accurately provided by the present invention.

These and other objects, features, and advantages will become more apparent from the following description taken in conjunction with the accompanying drawings wherein.

Figure 1:
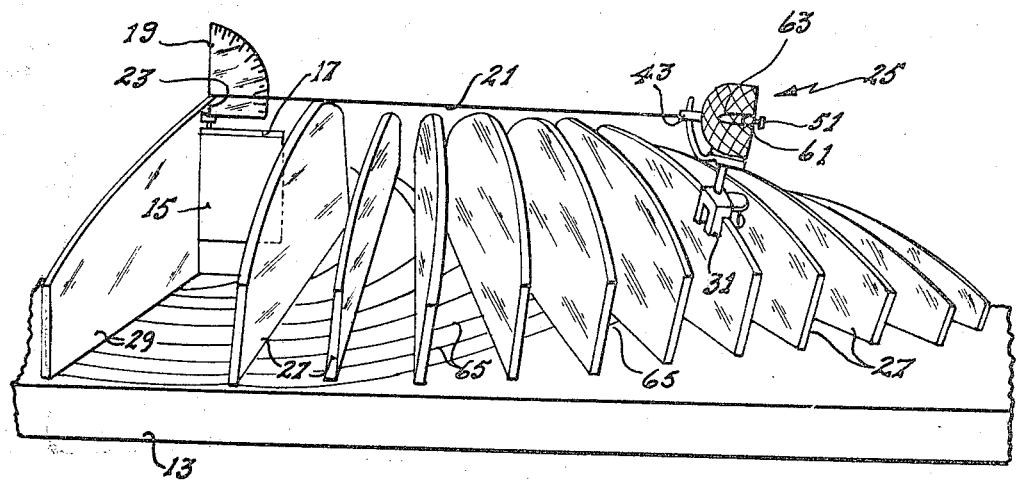
FIG. 1 is a general view in perspective of the satellite trajectory and attitude simulator.

Referring now to the figures in which like reference characters are used to refere to like parts throughout the specification, the invention includes a base 13 on which there is engraved a series of semicircles representing distance in nautical miles. A radar simulator 15 is located in the center of the semicircles and includes a platform positioned at a fixed distance above the base 13. An azimuth scale 17 is provided which reads plus and minus ninety degrees from midpass azimuth. Alternatively, the azimuth scale 17 can be made a full 360 degrees which, if positioned with the reference plane pointing north and south, will read time bearing. Reversing the north and south reference would then require rotating the circular azimuth indicator 180 degrees.

An elevation indicator 19 is mounted so as to pivot about an axis through the center of the azimuth indicator 17 and is engraved with zero degrees horizontal to the base 15. Angles of minus 10 degrees to plus 90 degrees are engraved on the outer edge of the elevation indicator 19. A spring and spool arrangement (not shown) is provided inside the base of the radar simulator structure 15 for paying out the string 21 through the upstanding tubular element 23 toward the satellite model generally designated by the reference numeral 25. Slant range can be found by measuring along the length of the string 21 from the point of exit in the tubular element 23 to the outer end of the string 21, then adding a fixed range increment which represents the distance from the outer end of the string 21 to the center of the satellite model.

Figure 2:
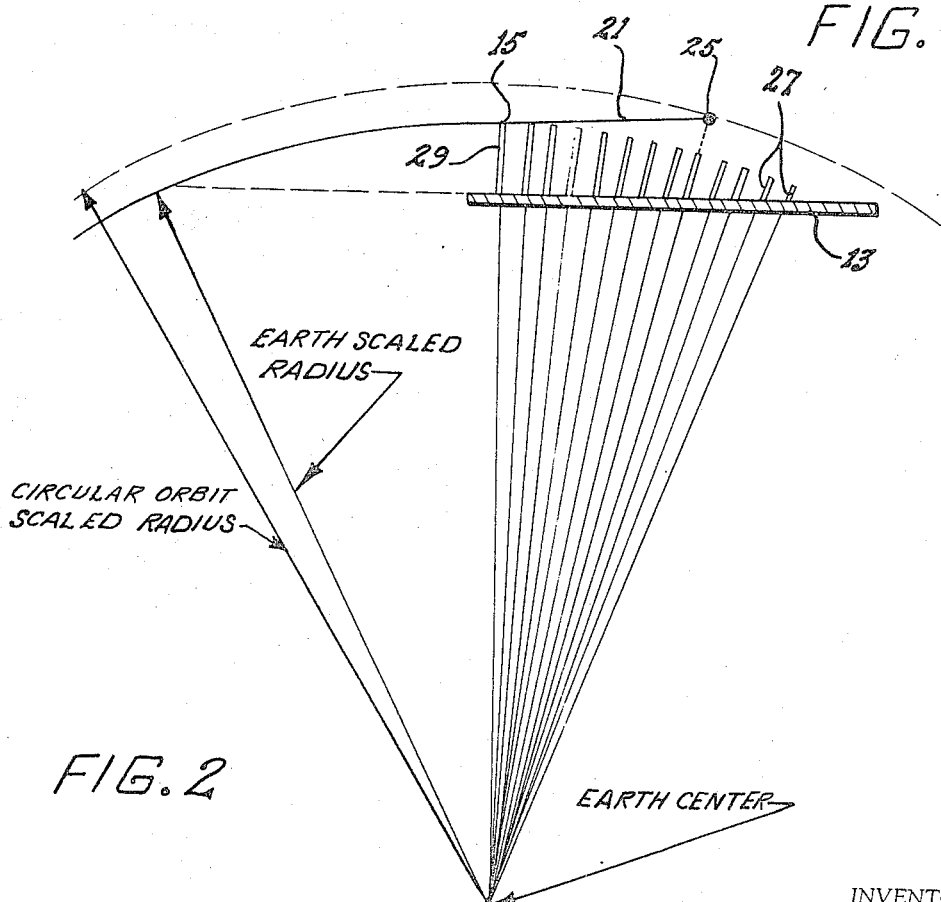
FIG. 2 is a diagrammatic view of the invention in relation to earth geometry.
Figure 3:
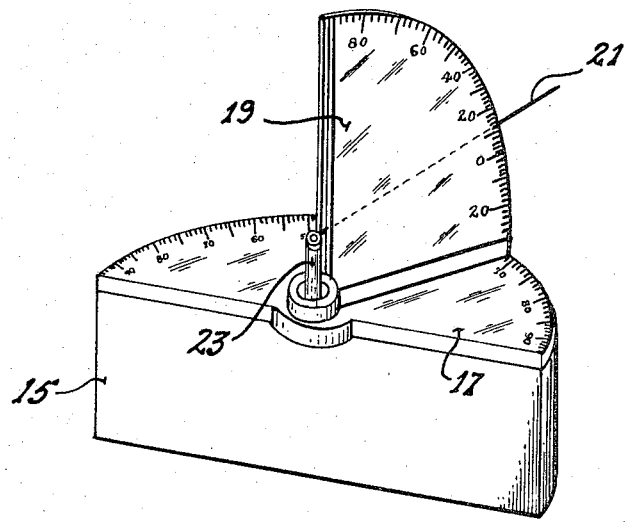
FIG. 3 is an enlarged view in detail of the azimuth and elevation indicator elements.

A series of trajectory cards 27 are provided to indicate each hundred nautical miles beginning with 200 nautical miles surface range. In addition a partial trajectory card 29 is provided to indicate zero range which simulates an overhead pass. Another partial card may be added, if desired, to indicate the 100 nautical mile range. The geometric details of the trajectory cards 27 and 29 as they are related to earth geometry are shown in detail in FIG. 2. Each card is made with a radius of 68.76 inches which corresponds to the earth's radius scaled 50 nautical miles to the inch. Center height for each card is measured along the card surface to the upper edge at its highest point along the surface nearest the simulated radar 15. The upper edge of each trajectory card 27 and 29 is marked off in one-half inch increments to represent 25 nautical miles starting at the center position and working outwardly in each direction. Angle supports (not shown) are provided for maintaining the trajectory cards 27 at their proper earth angle.

Figures 4, 5:
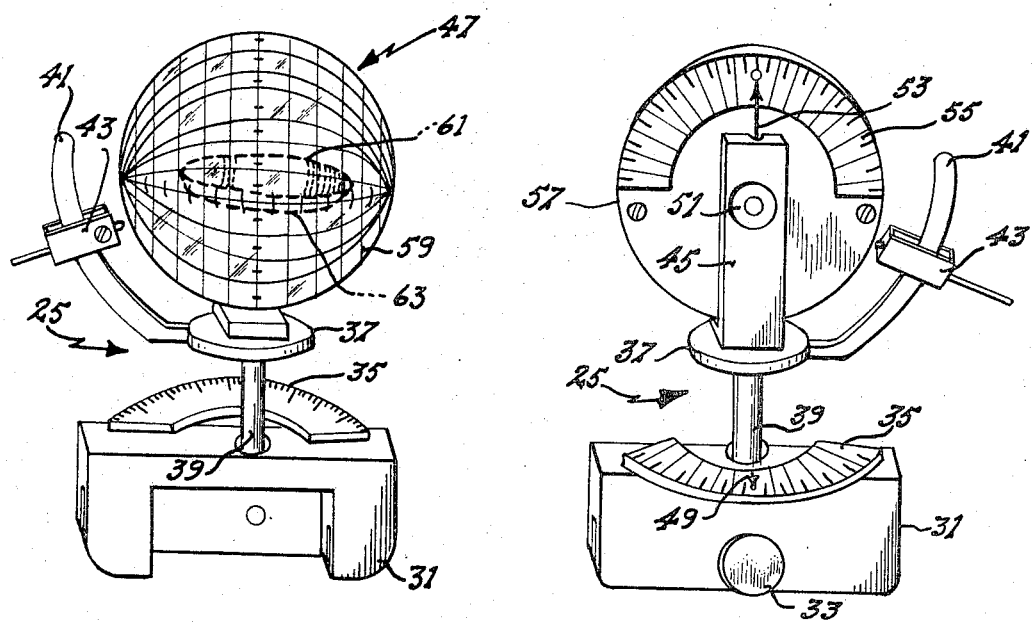
FIG. 4 is a front view in detail of the satellite model showing the graticule.
FIG. 5 is a rear view in detail of the satellite model showing the pitch and yaw angle scales.

The satellite model 25, best shown in FIGS. 4 and 5, is constructed of metal and includes a base slider 31 which is provided with a thumb screw 33 for locking in position on a trajectory card while readings are taken. A yaw scale 35 is attached to the upper surface of the base slider 31. A pedestal 37 is rotatably attached near the upper end of stud sections 39 which may be varied in length depending upon the corresponding altitude of the satellite above the earth. One end of an arc segment 41 is fixedly attached at a point on the outer periphery of the pedestal 37 and is disposed upward around the satellite model and spaced therefrom. An aspect indicator 43 is arranged to slide along the arc segment 41 and serves to indicate the line of sight from the radar simulator 13.

An angle support member 45 is provided to support the graticule assembly 47 and is fixedly attached to the upper end of stud section 39 by means of a set screw (not shown). When loosened the set screw permits yaw adjustment by rotating the stud 39 and graticule assembly 47 until the pointer 49 is set at the desired angular reading. Pitch adjusting means is provided for setting the pitch angle by loosening pitch adjusting screw 51 and turning the graticule assembly 47 until the pointer 53 is positioned at the proper angular reading on pitch indicating scale 55. This arrangement permits rotating and locking the graticule assembly in pitch.

The graticule assembly 47 consists of a circular plate 57 upon which is mounted the pitch indicating scale 55. The graticule itself 59 is a transparent hemisphere upon which is engraved at each ten degrees in the conventional theta ($\theta$) and phi ($\phi$) angles. The graticule 57 is transparent to permit viewing an enclosed representative satellite model 61 with its center if gravity located at the referenced satellite point and its principal axis aligned with the axis of the graticule sphere 59. Roll motion of the satellite is introduced by positioning a semicircular wire fiducial 63 which pivots at the nose and tail of the satellite model 61 inside the hemispherical graticule 59. Roll is simulated by removing the graticule 59 and positioning the roll fiducial 63 to the desired angle which may be zero to 180 degrees or 180 to 360 degrees depending upon the direction given the satellite replica 61 inside the graticule 59.

In operation, the satellite trajectory simulator is set up as shown in FIG. 1. The trajectory cards 27 are located at equal intervals from the observation point radar simulator 15 and perpendicular to the vertical plane formed by the satellite and the observation point at midpass. Thus set up, the satellite model 25 is placed on one of the tracks and moved until the elevation indicator 19 is zero. This is the condition of rise or fade, depending on the simulated direction of flight. Assuming rise, the pointer of the aspect indicator 43 opposite the graticule 59 is read observing the established reference in terms theta and phi. Subsequent positions along the track permit readings in succession which result in data of aspect throughout a simulated pass from rise to fade when plotted on rectilinear paper as a family of aspect traces. A related family of aspect traces will obtain for each altitude simulated and from the data thus obtained, a statistical distribution of aspects can be derived.

In order to simulate a specific trajectory relative to a designated earth-based sensor, it is necessary to determine the orbital ephemeris of a particular pass by applying the indicated azimuth, elevation and range to obtain positioning of the trajectory card. One starting point is the azimuth of the highest elevation occurring during the pass. For this condition the satellite model adjusted to the proper altitude is placed on the center line of the particular card 27 and the azimuth is read on the scale 17. At this position the plane of the card 27 is tangent to a base circle 65 representing surface range to the ground trace. Slant ranges from the radar simulator 15 to the satellite 25 can be read along the line of sight 21. In this position elevation can be read and checked against the ephemeris.

The present invention may also be used in conjunction with a ground trace calculator wherein representative orbital traces are applied on a rotating transparent overlay of the Northern Hemisphere. Range circles and bearing lines are prepared for tracking stations of interest. In this way range and azimuth determinations can be made for various inclination angles and the range circles and azimuth scales on the satellite simulator are directly related to those on the ground trace calculator. When the statellite simulator is set up in this fashion, the pass may be simulated by moving the satellite model 25 along the track from rise to set and observing azimuth, elevation and slant range from the radar simulator 15 and the theta and phi angles from the graticule 59. Once the aspect determinations have been made with desired yaw, pitch and roll having been set into the satellite model, these traces can be related directly to antenna patterns, satellite-based sensor patterns and back-scattering patterns. When such patterns are presented on a theta/phi plot in the form of contours, the aspect traces plotted with the same scale on transparent paper can be used as overlays to relate aspects with satellite properties and configuration.

The trajectory cards 27 are cut with a fixed radius equal to the scaled radius and are thus circular arcs. When the satellite model 25 is moved across on one of these tracks the trajectory described by the satellite is also a circular arc. In order to simulate the ephemeris of a highly elliptical orbit, it is necessary to re-establish altitude throughout the simulated pass. Also, atmospheric refraction and curvature of the earth are phenomena which must be considered under certain conditions and the operator of the satellite simulator can make proper allowances when appropriate.

From the foregoing it will be seen that the invention has been presented with particular emphasis on a preferred embodiment. It will be apparent to one skilled in the art that certain changes, alterations, modifications and substitutions can be made in the arrangement and location of the various elements without departing from the true spirit and scope of the invention as defined in the appended claims.

Having thus set forth and disclosed the nature of my invention, what I claim is:

1. A satellite trajectory simulator for simulating the relative position of an earth satellite with respect to the earth comprising a base plane having earth range markings thereon, a horizontal protractor having its central axis located at an observation point and positioned a fixed distance above said base, a vertical protractor having its central axis coincident with said horizontal protractor and pivotally attached thereover, a plurality of trajectory cards spaced at fixed intervals on said base to represent corresponding earth surface distances, each of said trajectory cards having an upper edge curved in proportion to the radius of curvature of the earth, a statellite model assembly slidably attached to the upper curved edge of one of said trajectory cards, said satellite model assembly including a satellite model mounted thereon, means for adjusting said satellite model to predetermined yaw, pitch, and roll settings, and means for measuring the earth range distances from the point of observation to said satellite model.

2. The satellite trajectory simulator defined in claim 1 wherein the plurality of trajectory cards are of gradually diminishing height as the distance from the point of observation increases thereby representing the curvature of the earth, each of said trajectory cards being mounted on said base at an angle such that the plane surface thereof is coincident with the radius of the earth as scaled.

3. A satellite trajectory simulator for simulating the relative locations of an earth satellite with respect to the earth comprising a base plane having earth range markings thereon, a radar simulator mounted above said base plane, said radar simulator including means for determining azimuth and elevation of said satellite, a plurality of trajectory cards spaced at fixed intervals on said base to represent corresponding earth distances from said radar simulator, each of said trajectory cards having an upper edge curved in proportion to the radius of the curvature of the earth, a satellite model assembly slidably attached to the upper curved edge of one of said trajectory cards, said satellite model assembly including a satellite model mounted thereon, means cooperating with said satellite assembly for introducing predetermined yaw, pitch and roll settings, and means mounted on said radar simulator for measuring the earth range distances of said satellite therefrom.

4. The satellite trajectory simulator defined in claim 3 wherein said radar simulator comprises a horizontal protractor having its central axis passing through the beam center of said radar simulator, a vertical protractor having its central axis passing perpendicularly through the beam of said radar simulator, and indicating means for determining the azimuth and elevation directional readings of said radar simulator.

References Cited

UNITED STATES PATENTS

| | | | |
|---|---|---|---|
| 2,396,453 | 3/1946 | Windle | 33—1 |
| 3,068,574 | 12/1962 | Bieg | 33—1 |

MALCOLM A. MORRISON, *Primary Examiner.*

J. RUGGIERO, *Assistant Examiner.*